(12) United States Patent
Tamura et al.

(10) Patent No.: US 8,082,013 B2
(45) Date of Patent: Dec. 20, 2011

(54) INFORMATION PROCESSING APPARATUS AND CELLULAR PHONE

(75) Inventors: Toshiya Tamura, Kokubunji (JP); Tosaku Tanada, Kunitachi (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1023 days.

(21) Appl. No.: 12/006,378

(22) Filed: Jan. 2, 2008

(65) Prior Publication Data

US 2008/0268922 A1 Oct. 30, 2008

(30) Foreign Application Priority Data

Apr. 27, 2007 (JP) ................ P2007-118803

(51) Int. Cl.
*H04B 1/00* (2006.01)
(52) U.S. Cl. .................. 455/575.2; 455/556.1
(58) Field of Classification Search .............. 455/575.2, 455/550.1, 560, 569.1, 556.1; 704/500
See application file for complete search history.

(56) References Cited

U.S. PATENT DOCUMENTS

| 6,597,702 | B1 * | 7/2003 | Caugherty ............ 370/410 |
| 6,735,567 | B2 * | 5/2004 | Gao et al. ............ 704/258 |
| 7,185,240 | B2 * | 2/2007 | Saito et al. ............ 714/700 |
| 7,369,515 | B2 * | 5/2008 | Salesky et al. ............ 370/260 |
| 7,567,897 | B2 * | 7/2009 | Halcrow et al. ............ 704/201 |
| 2004/0172376 | A1 * | 9/2004 | Kobori et al. ............ 707/1 |
| 2006/0179109 | A1 * | 8/2006 | Ko ............ 709/203 |

OTHER PUBLICATIONS

Mao et al., "Achieving Service Portability in ICEBERG", pp. 20-27, IEEE Explorer 2000.*

* cited by examiner

*Primary Examiner* — Nay A Maung
*Assistant Examiner* — Angelica Perez
(74) *Attorney, Agent, or Firm* — Maschoff Gilmore & Israelsen

(57) ABSTRACT

According to an aspect of the invention, there is provided an information processing apparatus including: a storing unit configured to store a coded audio data corresponding to one of a plurality of codec types, an acquiring unit configured to acquire first information which indicate codec types supported by an external device, a receiving unit configured to receive second information, which designates a codec type to be used for decoding received coded audio data, from the external device, a determining unit configured to determine whether the designated codec types is acceptable to transmit the coded audio data stored in the storing unit by comparing codec type corresponding to the coded audio data and the codec type designated by the external device, and a requesting unit configured to request the external device to switch the designated codec type to another codec type which is one of the codec types detected based on the second information.

13 Claims, 6 Drawing Sheets

INFORMATION PROCESSING APPARATUS AND CELLULAR PHONE

CROSS-REFERENCE TO RELATED APPLICATIONS

This application is based on and claims the benefit of priority from the prior Japanese Patent Application No. 2007-118803, filed on Apr. 27, 2007; the entire contents of which are incorporated herein by reference.

TECHNICAL FIELD

The present invention relates to an information processing apparatus, and more particularly, to an information processing apparatus capable of transmitting real-time audio data in a streaming manner.

BACKGROUND

Description of Related Art

Recently, as wireless communication technology that can be applied to an electronic device or the like, for example, wireless technique such as Bluetooth standard is known. By using the wireless communication technology of Bluetooth, audio data can be transmitted from a mobile information terminal such as a cellular phone or a portable music player to a counterpart apparatus such as a headset without using an audio cable.

As a profile for audio data transmission, for example, "Advanced Audio Distribution Profile (A2DP)" (see Advanced Audio/Video Distribution Profile (Bluetooth SIG)), "Generic Audio/Video Distribution Profile" (See Generic Audio/Video Distribution Profile (Bluetooth SIG)), or the like are known as a basic technique for audio data transmission. These are specifications for transmitting real-time audio data in a streaming manner between devices having a Bluetooth connection.

For example, in a mobile information terminal such as a cellular phone or a portable music player, audio data is compressed by using a coding method such as SBC (Sub Band Coding), MP3 (MPEG1 Audio Layer-3), ATRAC (Advanced Transform Acoustic Coding) 3, or the like and the compressed data is transmitted in units of packets. A counterpart apparatus such as a speaker or a headset reproduces data right after reception of the data without waiting for reception of all the packets. Accordingly, a user can listen to the sound from the mobile information terminal, the portable music player, or the like in almost real-time by using the counterpart apparatus such as a speaker or a headset.

In specifications defined by "Advanced Audio Distribution Profile (A2DP)" or "Generic Audio/Video Distribution Profile", it is defined that various parameters such as the type of a codec, a sampling rate, and a bit rate of audio data to be transmitted are confirmed between a device having audio data (audio source) and a device receiving the audio data before transmitting the audio data. Then, the audio data transmission, e.g. audio data streaming, is initiated. In addition, according to the specifications, an audio data streaming is allowed to be started from any side between the device (SRC) having the audio data and the device (SNK) receiving the audio data.

However, when a negotiation is performed by the lead of the device (SNK) receiving the audio data so as to start the audio data streaming, the device (SNK) receiving the audio data cannot know various parameters such as the type of codec, a sampling rate, a bit rate, and the like of the audio data transmitted from the device (SRC) having the audio data at a time when the negotiation is started, and generally, standard parameters are designated as various parameters for starting the audio data streaming assuredly. In other words, a standard SBC is designated as the type of the codec for the audio data, and standard values are designated for the bit rate and the sampling rate. Accordingly, parameters optimal to the device (SNK) receiving the audio data or the like cannot be selected and set.

SUMMARY

According to an aspect of the invention, there is provided an information processing apparatus including: a storing unit configured to store a coded audio data corresponding to one of a plurality of codec types, an acquiring unit configured to acquire first information which indicate codec types supported by an external device, a receiving unit configured to receive second information, which designates a codec type to be used for decoding received coded audio data, from the external device, a determining unit configured to determine whether the designated codec types is acceptable to transmit the coded audio data stored in the storing unit by comparing codec type corresponding to the coded audio data and the codec type designated by the external device, and a requesting unit configured to request the external device to switch the designated codec type to another codec type which is one of the codec types detected based on the second information.

DESCRIPTION OF THE EMBODIMENTS

Hereinafter, an embodiment of the present invention will be described with reference to the accompanying drawings.

Figure 1:
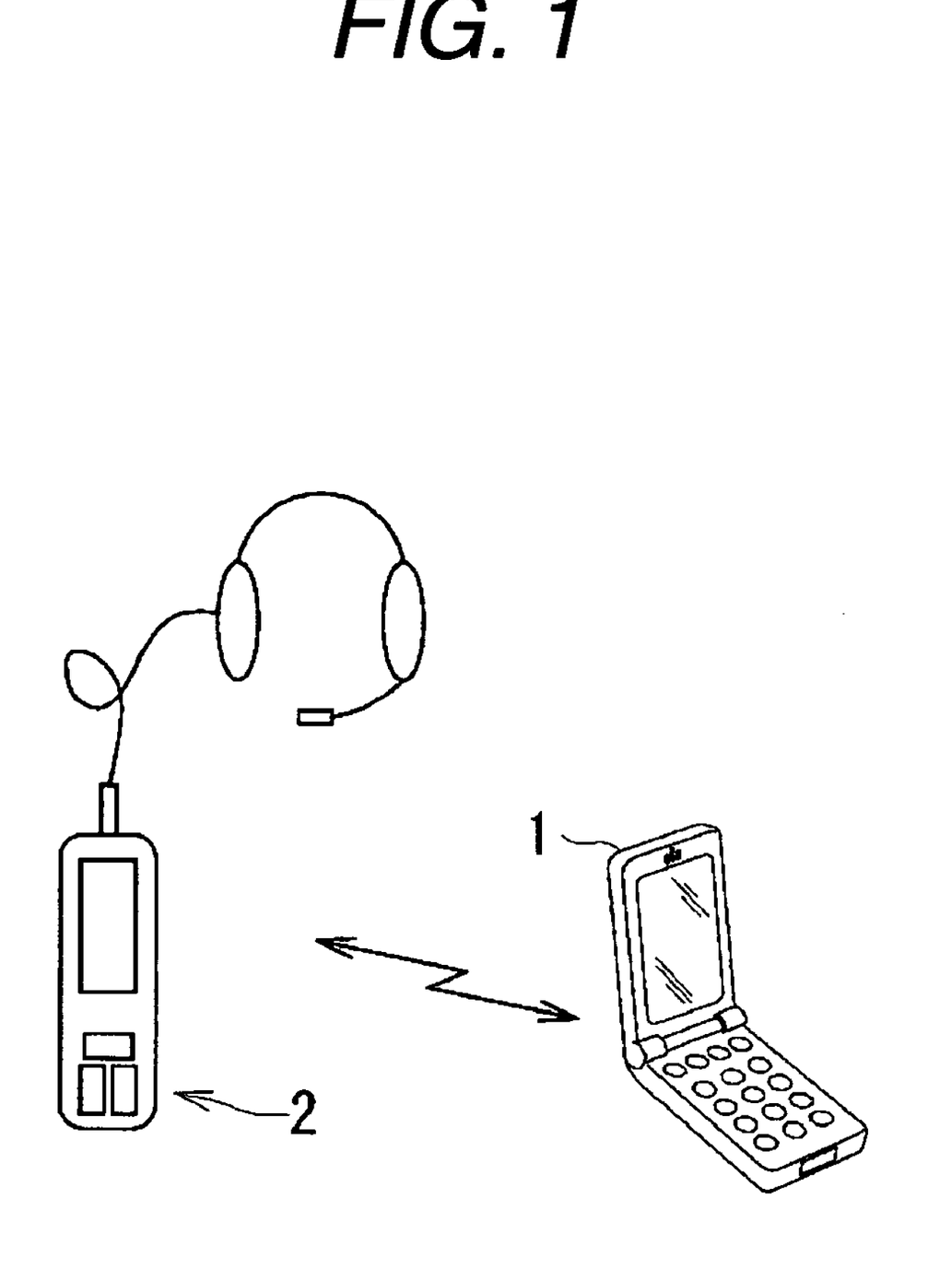
FIG. 1 is an exemplary schematic diagram showing the configuration of an information transmission/reception system according to an embodiment of the present invention.

As shown in FIG. 1, in the vicinity of a cellular phone 1, a headset 2 that can be used as a counterpart apparatus according to an embodiment of the present invention exists. The handset 2 may be called a rendering device. The headset 2 can receive audio data transmitted from the cellular phone 2 by using wireless communication (for example, Bluetooth or the like) and reproduce the audio data in real time.

Figure 2:
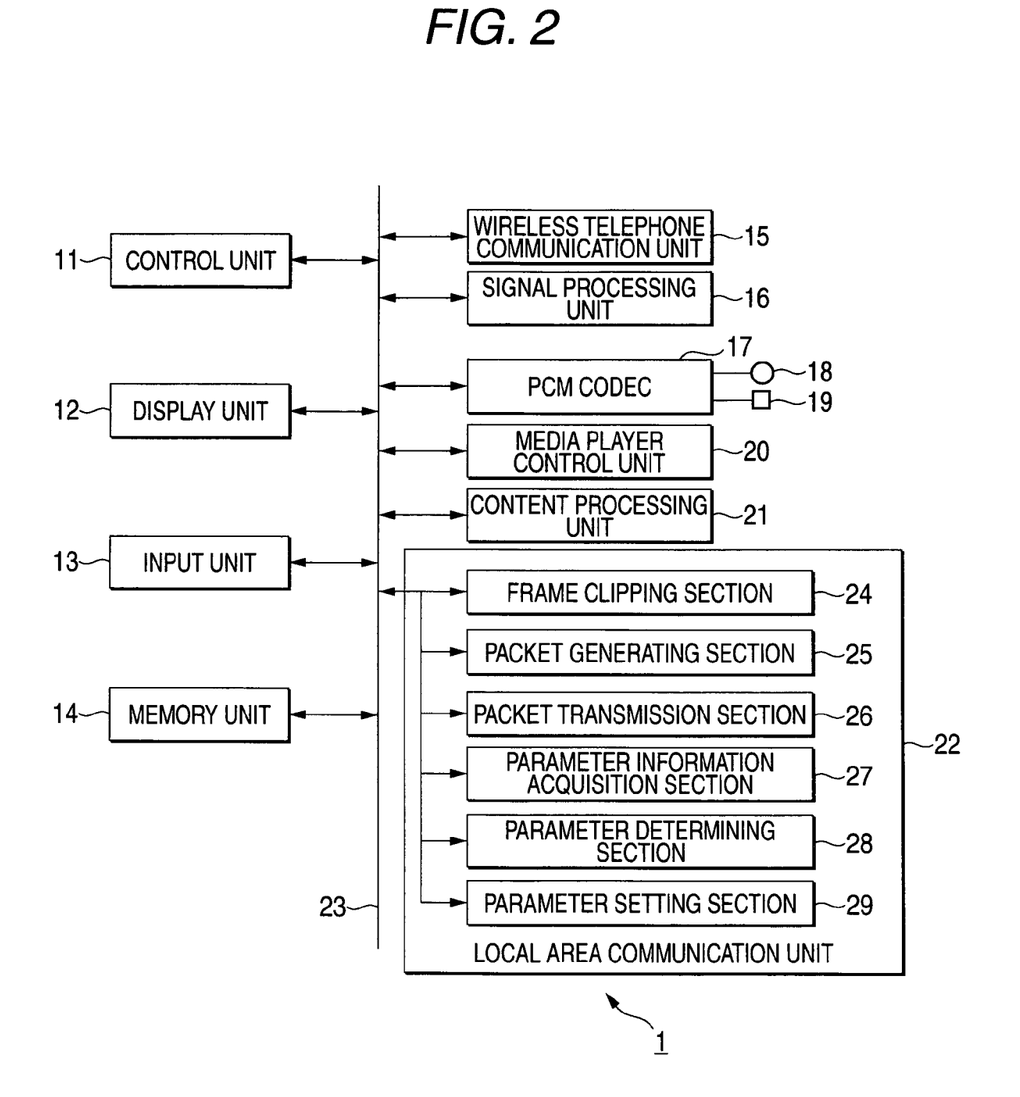
FIG. 2 is an exemplary block diagram showing the internal configuration of a cellular phone that can be used as an information processing apparatus according to the embodiment of the present invention.

FIG. 2 shows the internal configuration of the cellular phone 1 shown in FIG. 1. As shown in FIG. 2, the cellular phone is comprised of a control unit 11, a display unit 12, an input unit 13, a memory unit 14, a cellular communication unit 15, a signal processing unit 16, a PCM codec 17, a microphone 18, a speaker 19, a media player control unit 20, a content processing unit 21, and a short-range wireless communication unit 22, and they are connected to one another through a bus 23.

The control unit 11 includes a CPU (Central Processing Unit), a ROM (Read Only Memory), a RAM (Random Access Memory), and the like. The CPU controls the overall operations of the cellular phone 1 by performing various processes in accordance with a program stored in the ROM or various application programs loaded into the RAM from the memory unit 14, generating various control signals, and supplying the control signals to other units. The RAM appropriately stores data required for the CPU to perform various processes or the like.

The display unit 12, for example, is constituted by an LCD (Liquid Crystal Display) or the like. The input unit 13 is constituted by alpha-numeric keys, operation keys, a power key or the like.

The cellular communication unit 15 receives a radio signal transmitted from a base station (not shown), through an antenna (not shown), acquires an intermediate frequency signal by down-converting the received radio signal, and performs a quadrature demodulation process, despreading and synthesis processes for each path by using a rake receiver (not shown), and the like. Then, received packet data output from the rake receiver is input to the signal processing unit 16.

The signal processing unit 16, for example, is constituted by a DSP (Digital Signal Processor) and the like. First, the signal processing unit 16 divides the received packet data into data for each medium such as audio and video and performs a decoding process for the data divided for each medium.

For example, when audio data is included in the received packet data, the signal processing unit 16 decodes the audio data by using an audio codec. In addition, when moving picture data is included in the received packet data, the signal processing unit 16 decodes the moving picture data by using a video codec. In addition, when the received packet data includes a downloaded content, the signal processing unit 16 demultiplexes the downloaded content into audio data and moving picture data, and transfers the audio data to the audio codec and the moving picture data to the video codec.

A PCM decoding process is performed for a digital audio signal, which has been acquired by the decoding process, by a PCM codec 17, and obtained analog audio signal is amplified and output from the speaker 19. On the other hand, a digital moving picture signal decoded by the video codec is supplied to be displayed in the display unit 12 through the bus 23.

The media player control unit 20, for example, controls a music player having a music control function.

A terrestrial digital one-segment radio receiver or the like may be included in the cellular phone 1 for controlling various media players such as a terrestrial digital one-segment player, for example, implemented by executing an application program in a case where a terrestrial digital one-segment broadcasting wave is received.

The content processing unit 21, for example, in a case where a music player is controlled by the music player control unit 20, first, decodes the audio data that has been encoded in a encoding method such as AAC, aacPlus, MP3, ATRAC, or SBC by using a decoding method corresponding thereto and performs a re-encoding process by using a different encoding method and the like.

The short-range wireless communication unit 22, for example, is constituted by a module that performs wireless communication by using Bluetooth (registered trademark) and the like. The short-range wireless communication unit 22 performs wireless communication with a headset 2 located in the vicinity of the cellular phone 1 or the like. A wireless communication method (for example, infrared communication) other than Bluetooth may be used. The short-range wireless communication unit 22 includes a frame clipping section 24, a packet generating section 25, a packet transmission section 26, a parameter information acquisition section 27, a parameter determining section 28, a parameter setting section 29, and the like.

The frame clipping section 24 reads out the audio data stored in the memory unit 14, clips the read-out audio data into frames appropriate for the codec type (for example, an encoding method such as AAC) thereof, and supplies the clipped audio data in units of frames to the packet generating section 25.

The packet generating section 25 generates packets to be transmitted to the headset on the basis of the audio data in units of frames clipped by the frame clipping section 24 and sequentially supplies the generated packets to a buffer (not shown). The buffer, for example, has a configuration for a FIFO (First In First Out) mode and sequentially buffers (temporarily stores) the packets sequentially supplied from the packet generating section 25.

The packet transmission section 26 sequentially reads out packets buffered in the buffer and sequentially transmits the read-out packets of a predetermined amount at predetermined timings to the headset 2 by using wireless communication.

The parameter information acquisition section 27 acquires parameter information that is information on parameters (for example, a codec type, a sampling rate, a bit rate, and the like) supported by the headset 2 from the headset 2 that is an counterpart apparatus by using wireless communication.

The parameter determining section 28 determines whether a parameter designated in a negotiation from the headset 2 for a parameter of transmission of audio data to the headset 2 used as a counterpart apparatus is appropriate for audio data to be transmitted to the headset 2 by using the acquired parameter information.

When it is determined that the parameter designated in the negotiation from the headset 2 is not appropriate for audio data to be transmitted to the headset 2, the parameter setting section 29 transmits a denial response to the headset 2, performs a negotiation for the headset 2 by using a parameter appropriate for the audio data to be transmitted from the cellular phone 1 to the headset 2, and initially sets the parameter of transmission of audio data to the headset 2.

Figure 3:
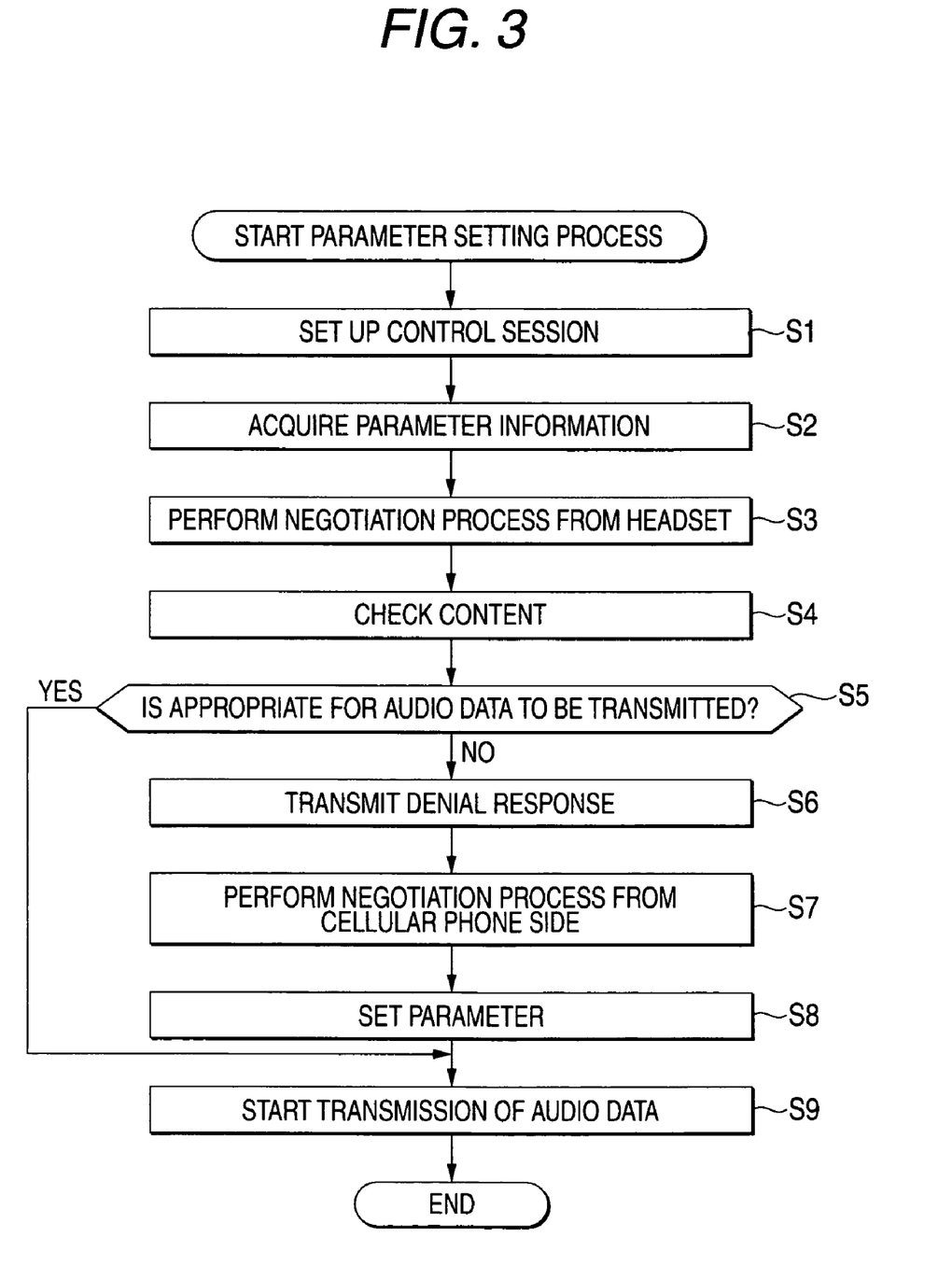
FIG. 3 is an exemplary flowchart of a parameter setting process of the cellular phone.
Figure 4:
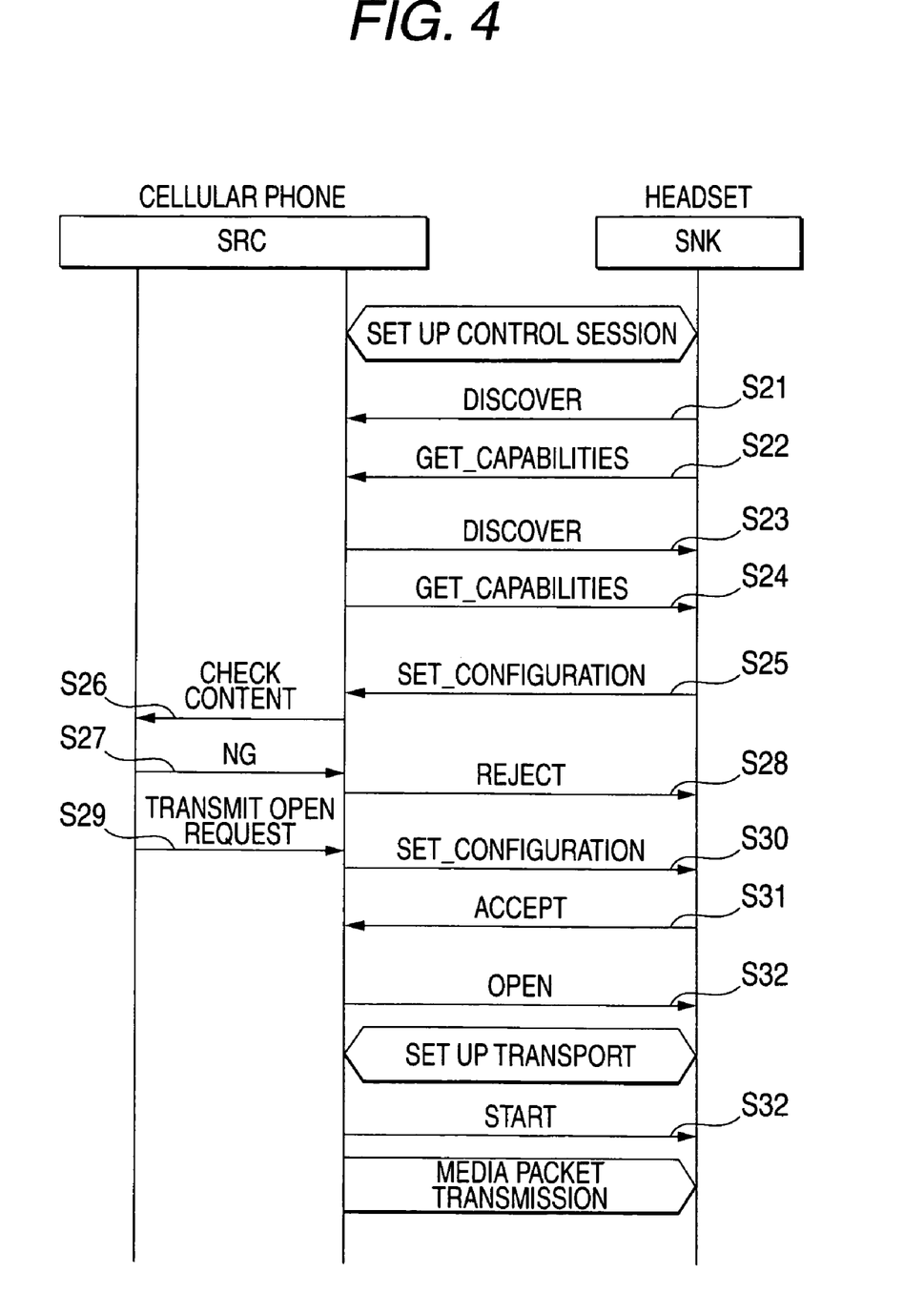
FIG. 4 is an exemplary flowchart showing a detailed process sequence between the cellular phone and a headset for the parameter setting process.

Next, a parameter setting process performed by the cellular phone 1 shown in FIG. 2 will be described with reference to a flowchart shown in FIG. 3. The parameter setting process is performed in a process where the headset 2, which is a counterpart apparatus SNK on the audio data reception side, initiates a negotiation with the cellular phone 1 before transferring streaming audio. FIG. 4 shows the detailed process sequence between the cellular phone 1 and the headset 2 for the parameter setting process described in FIG. 3.

In Step S1, the cellular phone 1 sets up a control session between the headset 2 and the cellular phone 1 by using the short-range wireless communication unit 22 and sets up a control session in which control data is exchanged to control a service for transmitting a packet such as a media packet to the headset 2.

After the control session is set up, as shown in Steps S21 to S22 shown in FIG. 4, a request for acquisition of parameter information that is information on parameters (for example, a codec type, a sampling rate, a bit rate, or the like) supported by the cellular phone 1 is made from the headset 2 side and the parameter information supported by the cellular phone 1 is acquired by the headset 2.

In particular, when the types of codecs supported by the cellular phone 1 are, for example, encoding methods such as AAC, aacPlus, and SBC, the parameter information indicating the supported types of codecs is acquired by the headset 2.

In Step S2, the parameter information acquisition section 27 of the short-range wireless communication unit 22 acquires the parameter information, which is information on the parameters (for example, the types of codecs, a sampling rate, a bit rate, and the like) supported by the headset 2, from the headset 2, which is a counterpart apparatus, by wireless communication and supplies the acquired parameter information on the parameters supported by the headset 2 to the parameter determining section 28.

For example, as shown in Steps S23 to S24 shown in FIG. 4, the parameter information that is information on the parameter (for example, the types of codecs, a sampling rate, a bit rate, and the like) supported by the headset 2 is acquired by the cellular phone 1. In particular, when the types of codecs supported by the headset 2, for example, are only encoding methods of AAC and SBC, the parameter information indicating the supported types of codecs is acquired by the headset 2.

In Step S3, the parameter setting section 29 performs a negotiation from the headset 2 for the parameter of transmission of audio data to the headset 2, which is a counterpart apparatus, by wireless communication in accordance with the negotiation of the headset 2 (Step S25 shown in FIG. 4).

At this moment, the parameter setting section 29 acquires parameters designated in the negotiation from the headset 2 for the parameters of transmission of audio data to the headset 2 and supplies the acquired parameter to the parameter determining section 28. When the headset 2 negotiates with the cellular phone 1, various parameters such as the type of codec, sampling rate, bit rate, and the like of the audio data transmitted from the cellular phone 1 cannot be known, and accordingly, a standard parameter (for example, SBC or the like as the type of a codec of the audio data) is designated.

In Step S4, the parameter determining section 28 checks a content for the music player that is configured as a higher level application program controlled by the media player control section 20 (Step S26 shown in FIG. 4).

In Step S5, the parameter determining section 28 determines whether the parameter designated in the negotiation from the headset 2 for the parameters of data transmission of audio data to the headset 2 is appropriate for audio data to be transmitted to the headset 2 by using the acquired parameter information that includes the parameters supported by the headset 2 (Step S27 shown in FIG. 4).

In particular, when it is determined that AAC, aacPlus, and SBC are supported by the headset 2 as the codec types on the basis of the acquired parameter information included in the parameters from the headset 2 and the SBC is designated to be used for transmitting the audio data by the handset 2 in the negotiation, it is determined that the AAC or the aacPlus which is an encoding method with a higher compression rate and a higher sound quality than SBC should be selected as the codec type. Accordingly, it is determined that SBC is not appropriate for the audio data to be transmitted to the headset 2.

In addition, when the audio data to be transmitted to the headset 2 is originally encoded by an encoding method of SBC, if the codec type of the parameter designated in the negotiation from the headset 2 for the parameter of data transmission of audio data to the headset 2 is AAC or aacPlus, it cannot be determined that re-encoding process can always be performed by the content processing unit 21 using AAC or aacPlus for any type of audio data. Accordingly, in such a case, it is determined that the parameter designated in the negotiation by the headset 2 is not appropriate for the audio data to be transmitted to the headset 2.

In addition, for example, in the cellular phone 1, when a mail application program is executed in the foreground and a music player is executed in the background, if the codec type of the parameter designated in the negotiation from the headset 2 for the parameter of data transmission of audio data to the headset 2 is AAC or aacPlus which has a heavy load on the CPU, it is determined that the parameter designated in the negotiation by the headset 2 is not appropriate for the audio data to be transmitted to the headset 2.

When it is determined that the parameter designated in the negotiation from the headset 2 is not appropriate for the audio data to be transmitted to the headset 2 In Step S5, the parameter setting section 29 transmits a denial response to the headset 2 on the basis of the result of determination made by the parameter determining section 28, in Step S6 (Step S28 shown in FIG. 4).

In Step S7, the media player control unit 20 executes the music player and transmits an open request for the headset 2 by using wireless communication, and the parameter setting section 29 performs a negotiation with the headset 2 by using a parameter appropriate for the audio data to be transmitted to the headset 2 from the cellular phone 1. In Step S8, the parameter setting section 29 initially sets the parameter of the transmission of audio data to the headset 2 (Steps S29 to S31 shown in FIG. 4).

In particular, when it is determined that the headset 2 supports AAC and aacPlus along with SBC as the types of codecs on the basis of the acquired parameter information including the parameter supported by the headset 2, if the codec type of the parameter designated in the negotiation from the headset 2 for the parameter of data transmission of audio data to the headset 2 is SBC, the parameter of transmission of audio data to the headset 2 is initially set by using AAC or aacPlus as a parameter appropriate for the audio data to be transmitted to the headset 2.

In addition, when the audio data to be transmitted to the headset 2 is originally encoded by an encoding method of SBC, if the codec type of the parameter designated in the negotiation from the headset 2 for the parameter of data transmission of audio data to the headset 2 is AAC or aacPlus, it cannot be determined that re-encoding process can always be performed by the content processing unit 21 using AAC or aacPlus for any type of audio data. Accordingly, in such a case, the parameter of transmission of audio data to the headset 2 is initially set by using, for example, SBC or MP3 as a parameter appropriate for transmission of audio data to the headset 2, even though the sound quality decreases more or less. In other words, in such a case, the parameter of transmission of audio data to the headset 2 is initially set by using a type of the codec which is not optimal but has the next priority among the types of codecs supported by the headset 2.

In the above, although the type of the codec of the audio data has been explicitly described, in the process of Step S8, parameters of transmission of audio data to the headset 2 such as the type of the codec, sampling rate, bit rate, and the like of the audio data are initially set.

Thereafter, a transport session for transferring packets, e.g. as media packet, is set up between the cellular phone 1 and the headset 2 (Step S32 shown in FIG. 4).

After the transport session is set up, in Step S9, the fame clipping section 24 clips the audio into frames appropriate for the codec type, the packet generating section 25 generates packets to be transmitted to the handset on the basis of the clipped audio data in units of the frames and temporarily stores the generated packets in a buffer (not shown), and the packet transmission section 26 sequentially reads out the packets buffered in the buffer and sequentially transmit the read-out packets of a predetermined amount at predetermined timings to the headset 2 by using wireless communication (Step S33 shown in FIG. 4).

On the other hand, when it is determined that the parameter designated in the negotiation from the headset 2 is appropriate for the audio data to be transmitted to the headset 2 in Step S5, the parameter setting section 29 receives the parameter designated in the negotiation by the headset 2 on the basis of the result of determination made by the parameter determining section 28 and sets the parameter of transmission of audio data to the headset 2 by using the received parameter. Then, the process proceeds to Step S9, and packets are generated and transmitted to the headset 2 in Step S9.

According to an embodiment of the present invention, parameter information that is information on the parameters (for example, the types of codecs, a sampling rate, a bit rate, and the like) supported by the headset 2 is acquired from the headset 2 that is a counterpart apparatus by using wireless communication. Then, it is determined whether the parameter designated in the negotiation from the headset 2 for the parameter of transmission of audio data to the headset 2 is appropriate for the audio data to be transmitted to the headset 2 by using the acquired parameter information. When it is determined that the parameter designated in the negotiation by the head set 2 is not appropriate for the audio data to be transmitted to the headset 2 by the determining unit, a denial response is transmitted to the headset 2 and a negotiation from the cellular phone 1 for the headset 2 is performed by using a parameter appropriate for the audio data to be transmitted to the headset 2, and therefore the parameter of transmission of the audio data to the headset 2 can be initially set.

Accordingly, a parameter appropriate for an audio data to be transmitted can be set in accordance with a current state of the cellular phone 1. Consequently, the parameter appropriate for the audio data to be transmitted can be set while a maximum of the capacity of the headset 2 is effectively used and the performance of the headset 2 is derived to the maximum extent on the basis of the current state (for example, whether the music player is executed in the background) of the cellular phone 1. As a result, the sound quality of audio data for reproduction in the headset 2 can be improved.

In addition, although a case where a music player is controlled by the media player control unit 20 has been explicitly described in the embodiment of the present invention, however, the embodiment can be applied to a case where any media player such as a terrestrial digital one-segment player is controlled.

In addition, in the parameter setting process described with reference to FIGS. 3 and 4, a content checking process for the music player configured as an higher level application program controlled by the media player control unit 20 is performed in the negotiation from the headset 2 and whether the parameter designated in the negotiation for the headset 2 is appropriate for the audio data to be transmitted to the headset 2 is determined. However, the present invention is not limited thereto, and it may be configured that the parameter designated in the negotiation with the headset 2 is used once so as to set up the transport session, and the parameter set in the negotiation with the headset 2 is determined whether to be appropriate for the audio data to be transmitted to the headset 2. Then, when the parameter set in the negotiation with the headset 2 is determined not to be appropriate for the audio data to be transmitted to the headset 2, it may be configured that a negotiation from the cellular phone 1 for the headset 2 is performed again by using a parameter appropriate for the audio data to be transmitted to the headset 2 and the parameter of transmission of the audio data to the headset 2 is set again.

Hereinafter, a parameter setting process using this method will be described.

Figure 5:
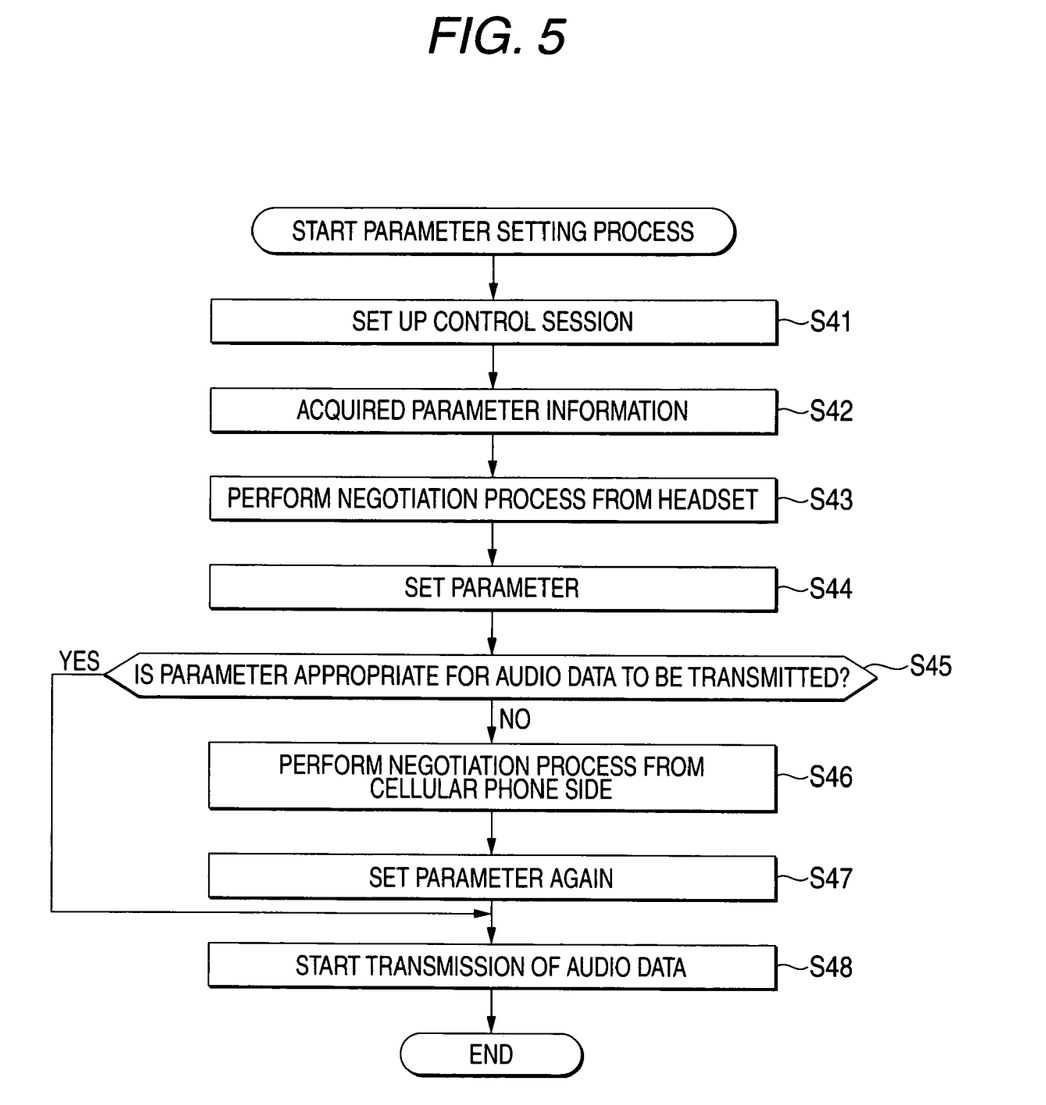
FIG. 5 is an exemplary flowchart of another parameter setting process of the cellular phone.
Figure 6:
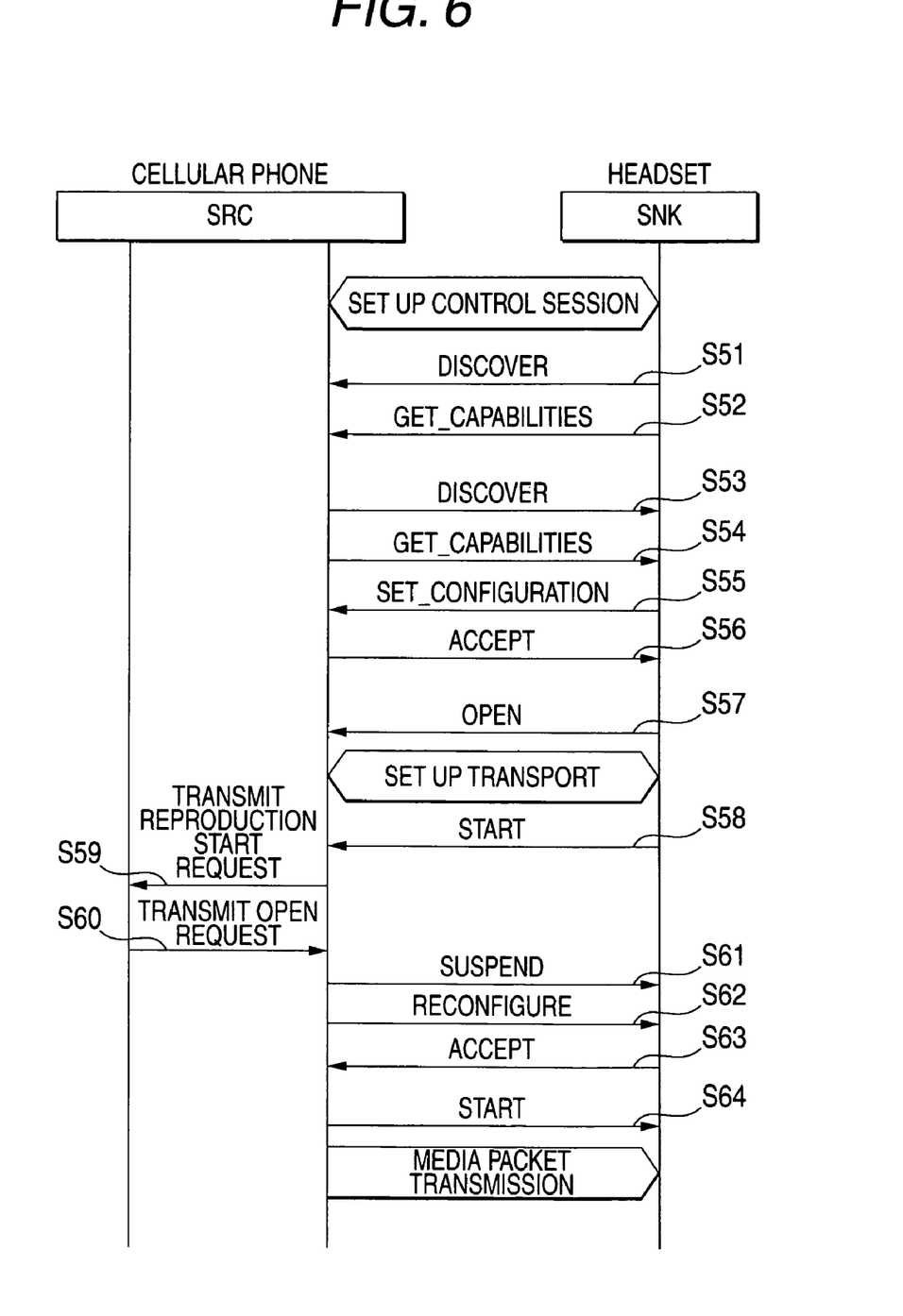
FIG. 6 is an exemplary detailed process sequence between the cellular phone and the headset in the parameter setting process.

Another parameter setting process performed in the cellular phone 1 shown in FIG. 2 will be described with reference to a flowchart shown in FIG. 5. FIG. 6 is a detailed process sequence between the cellular phone 1 and the headset 2 in the parameter setting process described with reference to the flowchart shown in FIG. 5. The processes of Steps S41 to S42 and S48 shown in FIG. 5 are basically the same as those of Steps S1 to S2 and S9 shown in FIG. 3, and descriptions thereof to be repeated are omitted and other corresponding processes will be appropriately omitted.

In Step S43, the parameter setting section 29 performs a negotiation from the headset 2 for a parameter of transmission of audio data to the headset 2 that is a counterpart apparatus in accordance with the negotiation of the headset 2 by using wireless communication (Steps S55 to S56 shown in FIG. 6).

In Step S44, the parameter setting section 29 acquires the parameter designated in the negotiation from the headset 2 for the parameter of transmission of audio data to the headset 2 and initially sets the parameter of transmission of audio data to the headset 2 by using the acquired parameter (Steps S55 to S56 shown in FIG. 6). When the headset 2 negotiates with the cellular phone 1, various parameters such as the type of codec, sampling rate, bit rate, and the like of the audio data transmitted from the cellular phone 1 cannot be known, and accordingly, a standard parameter (for example, SBC or the like as the type of a codec of the audio data) is designated.

Thereafter, an open request from the headset 2 is made by using wireless communication and the transport session for transferring packets, such as media packets, between the cellular phone 1 and the headset 2 is set up (Step S57 shown in FIG. 6). Then, a request for initiating a packet transmission to the cellular phone 1 from the headset 2 side is made (Steps S58 to S60 shown in FIG. 6).

In Step S45, the parameter determining section 28 determines whether the parameter set by the parameter setting section 29 in the negotiation from the headset 2 for the data transmission of audio data to the headset 2 is appropriate for audio data to be transmitted to the headset 2 by using the acquired parameter information that includes the parameters supported by the headset 2. A detailed determination method is the same as that in Step S5 shown in FIG. 3, and thus a description thereof to be repeated is omitted here.

When it is determined that the parameter set by the parameter setting section 29 in the negotiation from the headset 2 is not appropriate for the audio data to be transmitted to the headset 2 in Step S45, the parameter setting section 29 notifies the headset 2 side of a hold request in Step S46, performs a negotiation again with the headset 2 from the cellular phone 1 by using a parameter appropriate for the audio data to be transmitted to the headset 2, and sets the parameter of transmission of the audio data to the headset 2 again (Steps S61 to S63 shown in FIG. 6).

Thereafter, the process proceeds to Step S48, and a transmission process of audio data using the parameter set again is started (Step S64 shown in FIG. 6).

According to the embodiment of the present invention, it may be configured that the parameter designated in the negotiation from the headset 2 is used once so as to set up a transport session, and the parameter set in the parameter setting section 29 in the negotiation from the headset 2 is determined whether to be appropriate for the audio data to be transmitted to the headset 2. Then, when the parameter set in the parameter setting section 29 in the negotiation from the headset 2 is determined not to be appropriate for the audio data to be transmitted to the headset 2, it may be configured that a negotiation with the headset 2 is performed again by using a parameter appropriate for the audio data to be transmitted to the headset 2 from the cellular phone 1 and the parameter of transmission of the audio data to the headset 2 is set again. Accordingly, a parameter appropriate for the audio data to be transmitted can be set on the basis of the current state of the cellular phone 1. Consequently, the parameter appropriate for the audio data to be transmitted can be set while a maximum of the capacity of the headset 2 is effectively used and the performance of the headset 2 is derived to the maximum extent on the basis of the current state (for example, whether the music player is executed in the background) of the cellular phone 1. As a result, the sound quality of audio data for reproduction in the headset 2 can be improved.

In addition, the embodiment may be applied to a PDA (Personal Digital Assistant), a personal computer, a portable gaming device, a portable moving picture reproducing device, or any other information processing apparatus, along with the cellular phone 1.

The series of processes described in the embodiment of the present invention may be implemented by software or hardware.

In addition, in the embodiments of the present invention, although steps of flowcharts have been shown as an example of processes performed in time series according to the described sequence, however, the processes may be performed in parallel with one another or performed independently, instead of being performed in time series.

According to the embodiment, a parameter appropriate for a content to be transmitted can be set.

What is claimed is:

1. An information processing apparatus comprising:
    a storing unit configured to store a coded audio data corresponding to one of a plurality of codec types;
    an acquiring unit configured to acquire first information which indicates codec types supported by an external device;
    a receiving unit configured to receive second information which indicates a codec type selected by the external device to be used for encoding;
    a determining unit configured to determine whether the codec type indicated by the second information is an optimum codec type for encoding the audio data among the codec types indicated by the first information; and
    a requesting unit configured to send a notice to the external device upon determination by the determining unit that the codec type indicated by the second information is not the optimum codec type, the notice indicating that a codec type for encoding the audio data is changed from the codec type by the second information to another codec type that is one of the codec types indicated by the first information.

2. The information processing apparatus according to claim 1, further comprising:
    a clipping unit configured to clip the coded audio data in a unit of frame which has a size appropriate for the one of the plurality of codec types and generate a plurality of packets to be transmitted to the external device; and
    a transmitting unit configured to transmit the plurality of packets to the external device.

3. The information processing apparatus according to claim 1, wherein the first information includes at least one of coding method, sampling rate, and bit rate.

4. The information processing apparatus according to claim 1, further comprising:
    a session establishing unit configured to establish a control session with the external device,
    wherein the acquiring unit acquires the first information when the session establishing unit establishes a control session with the external device.

5. The information processing apparatus according to claim 2, further comprising:
    a session establishing unit configured to establish a control session and a transport session with the external device,
    wherein, the acquiring unit acquires the first information when the session establishing unit establishes a control session with the external device, and the transmitting unit transmits the plurality of packets to the external device via the transport session.

6. The information processing apparatus according to claim 5, wherein the requesting unit requests the external device to switch the codec type selected by the external device to the another codec type after the transport session has been established.

7. A cellular phone connectable to a base station, comprising:
    a storing unit configured to store a coded audio data corresponding to one of a plurality of codec types;
    an acquiring unit configured to acquire first information which indicate codec types supported by a rendering device;
    a receiving unit configured to receive second information which indicates a codec type selected by the rendering device to be used for encoding;
    a determining unit configured to determine whether the codec type indicated by the second information is an optimum codec type for encoding the audio data among the codec types indicated by the first information; and
    a requesting unit configured to send a notice to the rendering device upon determination by the determining unit that the codec type indicated by the second information is not the optimum codec type, the notice indicating that a codec type for encoding the audio data is changed from the codec type indicated by the second information to another codec type that is one of the codec types indicated by the first information.

8. The cellular phone according to claim 7, further comprising:
    a clipping unit configured to clip the coded audio data in a unit of frame which has a size appropriate for the one of the plurality of codec types and to generate a plurality of packets to be transmitted to the rendering device; and
    a transmitting unit configured to transmit the plurality of packets to the rendering device.

9. The cellular phone according to claim 7, wherein the first information includes at least one of coding method, sampling rate, and bit rate.

10. The information processing apparatus according to claim 7, further comprising:
    a session establishing unit configured to establish a control session with the rendering device,
    wherein the acquiring unit acquires the first information when the session establishing unit establishes a control session with the rendering device.

11. The cellular phone according to claim 8, further comprising:
a session establishing unit configured to establish a control session and a transport session with the rendering device,
wherein, the acquiring unit acquires the first information when the session establishing unit establishes a control session with the rendering device, and the transmitting unit transmits the plurality of packets to the rendering device via the transport session.

12. The cellular phone according to claim 11, wherein the requesting unit requests the rendering device to switch the codec type selected by the rendering device to another codec type after the transport session has been established.

13. The cellular phone according to claim 7, wherein the rendering device is a headset.

* * * * *